Figure 1:
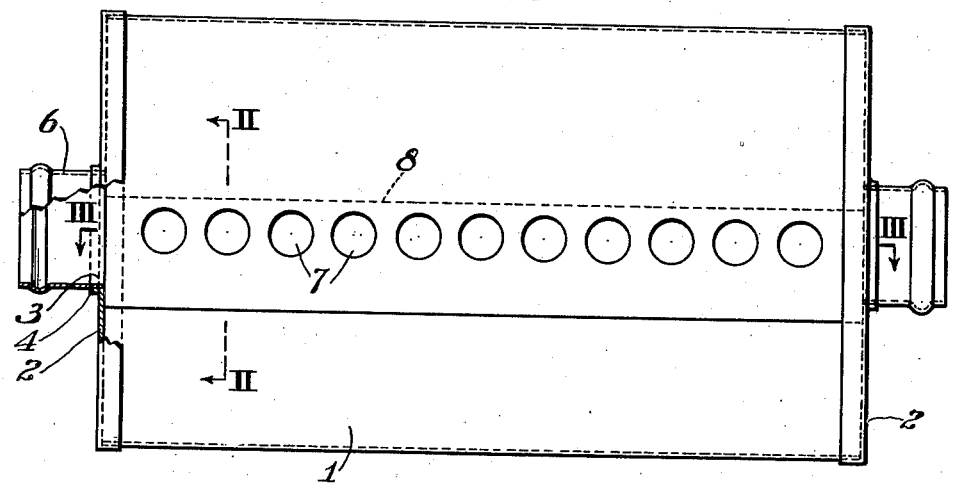

May 14, 1946.  W. P. YANT  2,400,185

AIR PURIFYING CANISTER

Filed Dec. 23, 1937  2 Sheets-Sheet 1

WITNESSES
A. B. Wallace.
V. A. Peckham.

INVENTOR.
William P. Yant
BY Brown, Critchlow & Flick
his ATTORNEYS.

May 14, 1946.  W. P. YANT  2,400,185
AIR PURIFYING CANISTER
Filed Dec. 23, 1937  2 Sheets-Sheet 2

WITNESSES
O.B.Wallace.
V.A.Peckham.

INVENTOR.
William P. Yant
BY Brown, Critchlow & Flick
his ATTORNEYS.

Patented May 14, 1946

2,400,185

UNITED STATES PATENT OFFICE 2,400,185

AIR PURIFYING CANISTER

William P. Yant, Pittsburgh, Pa., assignor to Mine Safety Appliances Company, Pittsburgh, Pa., a corporation of Pennsylvania Application December 23, 1937, Serial No. 181,379

11 Claims. (Cl. 183—40)

This invention relates to the purifying of air to render it fit for breathing, and more particularly to filter canisters used with respirators and breathing apparatus for that purpose.

Filter canisters are generally substantially cylindrical metal cans containing air-purifying material such as filters for removing particulate matter from the air and a suitable chemical compound for removing toxic or harmful gases from the air. These canisters are generally provided in the side wall with an inlet opening for impure air, and one or both of their ends are provided with outlet openings for the air purified inside of the canister. The outlets are connected by tubing to the face-pieces of the respirators. It is desirable to shield the contents of the filter directly behind the inlet opening so that there will be no danger of their becoming damaged by anything that might otherwise enter the inlet opening. A type of shield that has been extensively used heretofore is shown in Patent No. 2,063,990 dated December 15, 1936, issued to Joseph B. Dym where it can be identified by the reference numeral 4. It will be observed that the shield projects from the outer surface of the canister, and it is this projection which sometimes causes trouble. That is, as the shield is wholly exposed it is sometimes bent inwardly towards the canister and the size of the inlet opening is thereby decreased. This may happen without the wearer of the respirator being aware of it, in which case breathing becomes very laborious and the result may even be fatal.

It is among the objects of this invention to provide a filter canister in which the filtering material within the canister is protected by a shield extending across the inlet opening, the shield being so positioned that it is protected from becoming bent or otherwise injured in use and also being so positioned that it prevents rainwater from entering the inlet and coming in contact with the filtering material. Another object is to provide such a canister having a side wall free from undesirable projections. A still further object is to provide a canister of this character in which a check valve is associated with the canister inlet opening.

In accordance with this invention a canister is provided in its side wall with an inlet opening for impure air and in at least one end wall with an outlet opening for the air that is purified in passing through the canister. A shield for protecting the filtering material within the canister from anything that might enter the inlet opening is disposed inside of the canister behind the inlet opening. The ends of the shield and at least the lower edge thereof are preferably connected to the canister, but the body of the shield is spaced inwardly from the canister so as not to obstruct the air inlet. The body of the shield may be provided with openings, in which case they are staggered relative to the inlet opening in the canister to prevent anything from being pushed past the shield and into the filtering material. In some cases it is desirable to mount a check valve between the canister and shield for closing the inlet during exhalation.

Figure 2:
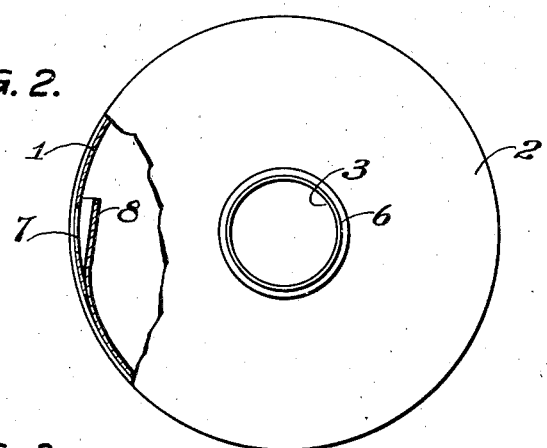
Figure 3:
Figure 4:
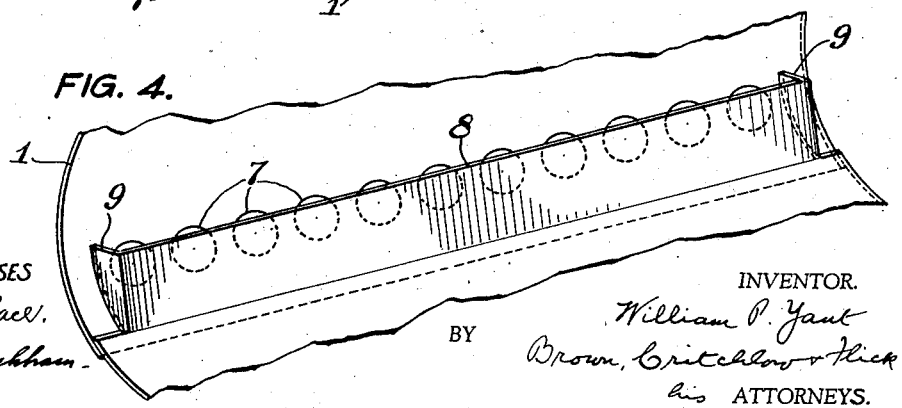
Figure 5:
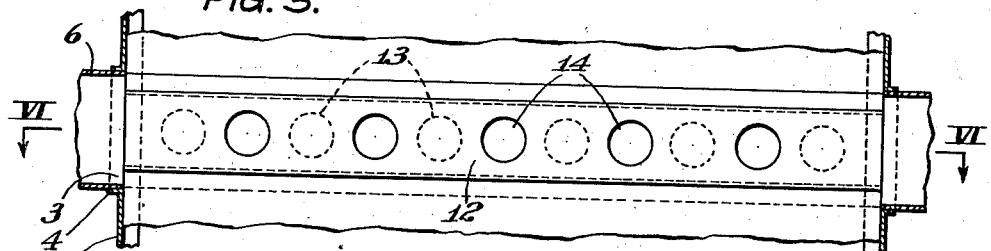
Figure 6:
Figure 7:
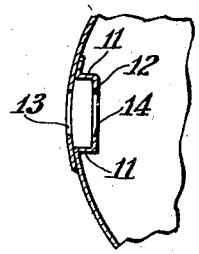
Figure 8:
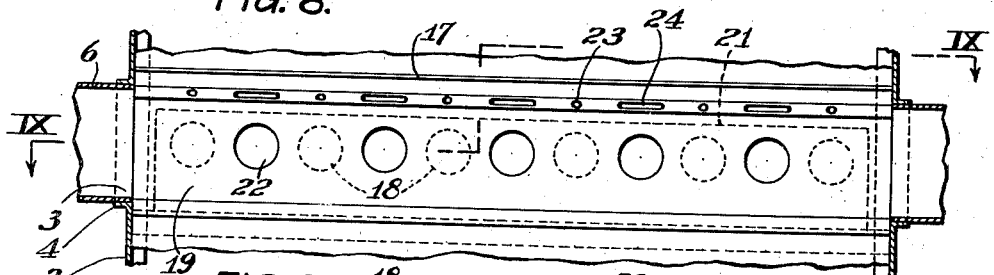
Figure 9:
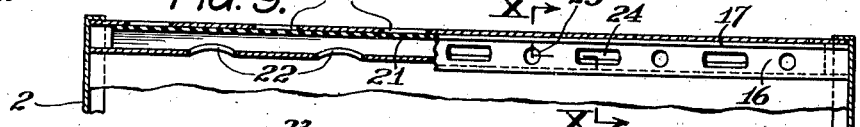
Figure 10:
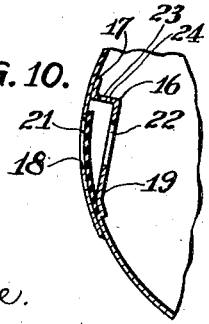
Figure 11:
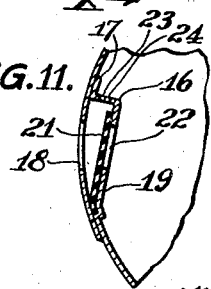

The invention is illustrated in the accompanying drawings in which Fig. 1 is a side view of my filter canister; Fig. 2 is an end view thereof broken away on the line II—II of Fig. 1; Fig. 3 is a fragmentary horizontal section taken on the line III—III of Fig. 1; Fig. 4 is a fragmentary perspective view of the inside of a modified embodiment of this invention; Fig. 5 is a fragmentary elevation of the interior of another modification; Fig. 6 is a longitudinal section taken on line VI—VI of Fig. 5; Fig. 7 is a transverse section taken on line VII—VII of Fig. 6; Fig. 8 is a view similar to Fig. 5 of another modification; Fig. 9 is a view taken on line IX—IX of Fig. 8; Fig. 10 is a transverse section taken on line X—X of Fig. 9; and Fig. 11 is a view similar to Fig. 10, but with the check valve open.

Referring to the first three figures of the drawings, the side wall 1 of the canister is preferably formed from a sheet of metal bent or rolled into substantially cylindrical shape with its end portions secured together, such as by soldering. The ends of this cylindrical body are closed by flanged end plates 2 one or both of which is provided with a central opening or outlet 3 encircled by an outwardly projecting flange 4. Extending through the center of the canister and projecting through end openings 3 is a tube 6 the ends of which are adapted to be connected by air hoses with a respirator face piece. The portion of this tube inside of the canister is perforated and is surrounded by any suitable air-purifying material (not shown), such, for example, as that shown in Patent No. 2,063,990 to Dym. The inlet for impure air is preferably formed by providing the side wall of the canister with a plurality of longitudinally spaced openings 7. The filtering material inside of the canister is protected from rain and snow, and objects that might be inserted through the inlet openings, by a shield extending across the inlet openings. It is a feature of this invention that the shield is so positioned that it can not become bent or otherwise injured in normal use. Accordingly, the shield 8 is disposed inside the canister behind the inlet openings with its body spaced therefrom so as not to shut off the passage of impure air from the inlet to the filtering material. The shield is connected to the canister by one edge or its ends or both. As the canister is intended to be carried with the inlet openings disposed in a substantially vertical plane, preferably both ends and the lower edge of the shield are connected to the canister. With this construction rain or snow that may enter the inlet openings is stopped by the shield and prevented thereby from draining into the filtering material.

As shown in Fig. 2, shield 8 is preferably integral with the side wall of the canister and is formed by overlapping the ends of the sheet that forms the side wall. The edge of the outer overlapping portion is secured to the side wall some distance from the edge of the inner overlapping portion that forms the shield and that is bent inwardly somewhat. The ends of the shield are secured to the outer overlapping portion by curving the ends outwardly as shown in Fig. 3.

It will thus be seen that with a canister constructed in accordance with this invention the filtering material within the canister is shielded from injurious outside objects, but as the shield is inside of the canister it can not be bent outwardly against the inlet openings and thereby cut off part of the air supply. Furthermore, the outer surface of the canister side wall is free of undesirable obstructions.

A modification of this invention is illustrated in Fig. 4 where it will be seen that the ends of shield 8 are slit longitudinally a short distance and that the end portions 9 thus formed are bent back substantially at right angles to the shield before being secured to the canister. This is another way of fastening the ends of the shield to the canister, and it provides an air passage of uniform width between the inlet openings and the shield.

In the modification shown in Figs. 5, 6 and 7 the shield is strengthened by securing its free edge to the side wall of the canister. As shown in Fig. 7, the shield is preferably formed by bending the overlapped portion of the sheet that forms the canister side wall to provide parallel upper and lower flanges 11 connected by a web or body portion 12 spaced inwardly from the side wall. The upper flange of the shield is provided with an extension that is turned upwardly to lie against the side wall to which it is soldered or otherwise connected.

The portion of the canister side wall directly in front of the shield is provided with a series of inlet openings 13, preferably spaced apart more than the width of one opening. To permit air to be drawn through these openings and into the canister, the body portion of the shield behind them is likewise provided with a series of openings 14. In order that the shield will serve as such, its openings 14 are staggered relative to inlet openings 13 (Fig. 6), so that if anything is inserted in the latter openings, it will be stopped by the solid shield wall directly behind them.

The modified embodiment of Figs. 8 to 11 includes a check valve that prevents exhaled air from passing through the canister and deteriorating its contents. The shield corresponds more closely to the one shown in Fig. 2, but its upper or free edge is provided with an extension which is turned outwardly and then upwardly to form an upper flange 16 and a canister-engaging portion 17, like those shown in Fig. 7. The side wall of the canister is provided with a series of spaced inlet openings 18 which are closed by a check valve during exhalation.

This valve is disposed between the side wall and the body portion 19 of the shield. It is preferably a strip 21 of flexible material, such as rubber, the lower edge of which may be clamped or otherwise secured between the canister side wall and the lower edge portion of the shield, as shown in Figs. 10 and 11. This valve strip may be normally disposed against either the side wall or the body of the shield; in one case inhalation will open it and in the other case exhalation will close it. To aid in these opening or closing movements, the body of the shield is provided with openings 22 behind the valve strip, these openings being staggered relative to the main inlet openings for the same reason as in the preceding embodiment. As the valve strip closes these shield openings 22 when the valve is open (Fig. 11), additional openings must be provided to permit the incoming air to pass the shield. Such openings are formed in flange 16 above the valve, and may take the form of holes 23 or slots 24, or both, as shown in Fig. 9. By incorporating the check valve in the canister, it becomes unnecessary to provide a check valve in the air hose leading to the face-piece, or in the face-piece itself.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A canister for use with respirators and adapted to contain air-purifying material, said canister being provided in its side wall with an inlet opening for impure air and in an end wall with an outlet opening for purified air, and a shield inside of the canister behind the inlet opening, said shield extending longitudinally of the inlet opening with its ends and lower edge connected to the canister, the remaining portion of the shield being spaced from the inlet opening to form an upwardly directed air passage.

2. A canister for use with respirators and adapted to contain air-purifying material, said canister being provided in its side wall with an air inlet extending longitudinally thereof and in an end wall with an air outlet, and a shield inside of the canister behind the inlet, said shield extending longitudinally of the inlet and connected to the canister at the ends and one side of the inlet, the remaining portion of the shield being spaced from the inlet.

3. A canister for use with respirators and adapted to contain air-purifying material, said canister being provided in its side wall with a plurality of longitudinally spaced inlet openings for impure air and in at least one end wall with an outlet for purified air, and a shield inside of the canister behind the inlet openings, said shield extending longitudinally of the canister with its ends and one side connected thereto, the remaining portion of the shield being spaced inwardly from the inlet openings.

4. A canister for use with respirators and adapted to contain air-purifying material, the side wall of the canister being formed from a metal sheet bent into substantially cylindrical shape with its end portions overlapping and secured together, the outer overlapping portion being provided with an inlet opening for impure air and the inner overlapping portion being spaced therefrom with its ends secured to said outer portion to thereby form a shield behind the inlet opening.

5. A canister for use with respirators and adapted to contain air-purifying material, said canister being provided with a plurality of spaced inlet openings for impure air and with an outlet opening for purified air, and a shield extending across the inlet openings, the body of the shield being spaced from the canister and provided with a plurality of openings staggered relative to said inlet openings.

6. A canister for use with respirators and adapted to contain air-purifying material, said canister being provided in its side wall with a plurality of spaced inlet openings for impure air and in an end wall with an outlet opening for purified air, and a shield extending across the inlet opening, the body of the shield being spaced from the canister and provided with a plurality of openings staggered relative to said inlet openings and the opposite edges of said shield being connected to the side wall of the canister.

7. A canister for use with respirators and adapted to contain air-purifying material, said canister being provided with an inlet opening for impure air and with an outlet opening for purified air, a shield inside of the canister behind the inlet opening with its body spaced from the canister, and a check valve disposed between said shield and inlet opening for closing the latter during exhalation.

8. A canister for use with respirators and adapted to contain air-purifying material, said canister being provided with an inlet opening for impure air and an outlet opening for purified air, a shield inside of the canister behind the inlet opening with its body spaced from the canister, and a check valve disposed between said shield and inlet opening for closing the latter during exhalation, said body of the shield being provided with an opening behind said valve.

9. A canister for use with respirators and adapted to contain air-purifying material, said canister being provided with an inlet opening for impure air and with an outlet opening for purified air, a shield inside of the canister behind the inlet opening with its body spaced from the canister, and a check valve disposed between said shield and inlet opening for closing the latter during exhalation, said body of the shield being provided with an opening behind said valve and at one side of said inlet opening.

10. A canister for use with respirators and adapted to contain air-purifying material, said canister being provided in its side wall with an air inlet extending longitudinally thereof and in an end wall with an air outlet, and a shield inside of the canister behind the inlet, said shield extending longitudinally of the inlet and connected to the canister at the ends and at least one side of the inlet, the remaining portion of the shield being spaced from the inlet, and a strip of flexible material disposed between the shield and canister and secured thereto along one edge, said strip serving as a check valve for said inlet opening during exhalation.

11. A canister for use with respirators and adapted to contain air-purifying material, said canister being provided in its side wall with an air inlet extending longitudinally thereof and in an end wall with an air outlet, and a shield inside of the canister behind the inlet, said shield extending longitudinally of the inlet with its body portion spaced from the canister side wall and provided with an opening, the edge portions of the shield being connected to said side wall and one of said edge portions being provided with inlet openings, and a strip of flexible material disposed between the shield and canister and secured thereto along one edge with its free edge adjacent said shield inlet openings, said strip serving as a check valve for the inlet openings during exhalation.

WILLIAM P. YANT.